Jan. 21, 1969 L. PANNONE 3,423,263
PROCESS FOR MANUFACTURING CARPET AND RUG UNDERLAY
Original Filed Dec. 20, 1963
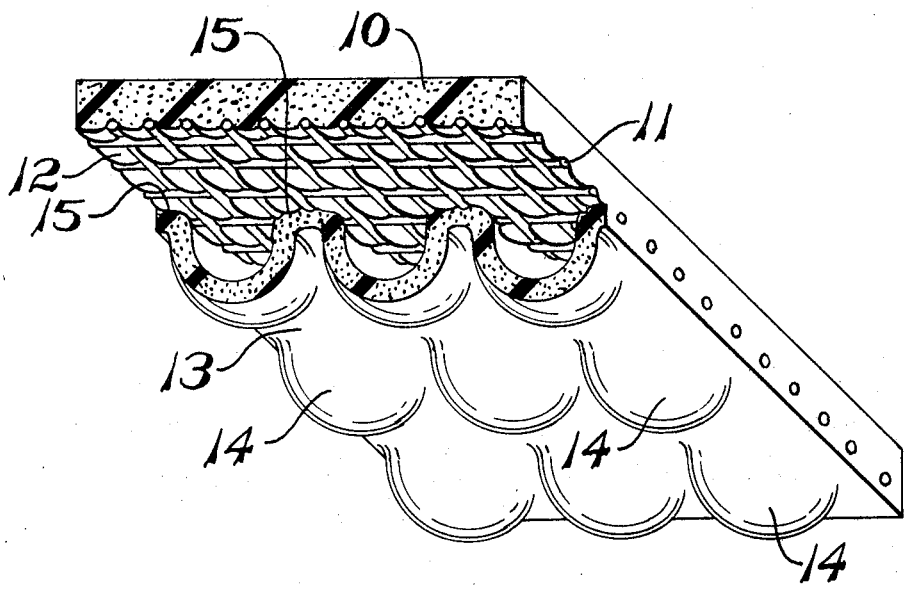
INVENTOR.
LESTER PANNONE
BY James R. Lindsay
ATTY.

United States Patent Office 3,423,263
Patented Jan. 21, 1969

3,423,263
PROCESS FOR MANUFACTURING CARPET
AND RUG UNDERLAY
Lester Pannone, Ansonia, Conn., assignor to The B. F.
Goodrich Company, New York, N.Y., a corporation
of New York
Original application Dec. 20, 1963, Ser. No. 332,053.
Divided and this application Mar. 8, 1967, Ser. No.
621,520
U.S. Cl. 156—79           1 Claim
Int. Cl. B32b 5/20

ABSTRACT OF THE DISCLOSURE

An underlay for supporting a carpet or rug is produced by disposing a layer of vulcanizable expandable sponge rubber composition onto an open-mesh conveyor, a layer of fabric upon the layer of sponge rubber composition, and a second layer of vulcanizable expandable sponge rubber composition over the fabric layer. The assembly is heated which causes the layer of sponge rubber composition deposited directly onto the open-mesh conveyor to sag into the interstices of the conveyor and simultaneously causes both rubber layers to expand. Upon further heating the rubber and fabric layers are united into an integral structure.

---

This invention relates to the manufacture of carpet and rug underlay and more particularly pertains to a process for making a sponge rubber underlay that preserves the wearing properties of the carpet or rug supported thereby. This is a division of application Ser. No. 332,053, filed Dec. 20, 1963, now abandoned.

Customarily a padding is placed under rugs and carpet in order to provide a resilient base to cushion the steps of a person walking on the carpet or rug and to produce a sensation when walking upon the carpet or rug suggesting that the carpet or rug has a deeper pile than it actually has. Various underlay constructions have been proposed, some of which have met with substantial success while others have not become popular. Some of the earlier types of underlay include jute fiber padding, underlay made of cattle or hog hair, underlay made from a combination of jute fiber and cattle or hog hair, and underlay made of rubberized jute fiber or rubberized animal hair. Although certain of these underlays still are being sold, a major proportion of the underlay sold today embodies resilient sponge rubber or other similar cellular materials.

One of the earlier sponge rubber underlays sold commercially consisted simply of a flat sheet of expanded cellular rubber ¼ to ½ inch thick. Although this type of sponge rubber underlay possesses many advantages over the fiber or hair paddings, such underlay is expensive and is heavy making it difficult to handle when it is installed. The weight consideration is not regarded as being so objectionable as to discourage the use of this underlay but the cost of such underlay became so great that such underlay seldom is used today. Consequently, flat sheet sponge rubber underlay has been replaced commercially almost entirely with a contoured sponge rubber underlay that employs a thinner layer of sponge rubber that is shaped with ridges or nodules protruding from one face with corresponding depressions in the opposite face to produce, in effect, an underlay with an effective thickness considerably greater than the actual thickness of the sponge rubber layer. Various contoured patterns have been used, some of which are shown in United States design Patents Nos. 188,888; 191,818 and 196,026. Since the contoured construction utilizes a much thinner layer of sponge rubber to obtain the same cushioning effect as underlay consisting merely of a flat sheet of sponge rubber, the contoured underlay understandably is considerably less expensive than the flat sponge rubber sheet construction.

The contoured configuration of such underlay normally is produced by depositing a strip of unexpanded vulcanizable sponge rubber composition onto an open-mesh wire or chain conveyor whose openings correspond generally to the outline of the protruding ridges or nodules desired to be formed in the underlay. The conveyor then is advanced through a heated zone sufficient in temperature to decompose a chemical blowing agent in the sponge rubber composition, the rubber composition upon being heated softens somewhat and sags into the interstices of the open-mesh conveyor while at the same time it expands to an open-cell cellular structure that is several times its original thickness. Upon the continued heating of the expanded rubber composition and with the composition sagging into the interstices of the chain conveyor, the expanded rubber composition becomes vulcanized and retains even after being cooled and removed from the conveyor mold the contoured configuration achieved as a result of the sheet of rubber composition having sagged into the interstices of the open-mesh conveyor. The above process for producing such underlay is utilized in the manufacture of the underlay described in United States Patent 2,703,909.

In using the contoured underlay described above, the underlay is deposited upon the floor with the protrusions of the contoured configuration face down. The carpet or rug then is drawn over the top of the underlay. To facilitate pulling the carpet or rug over the underlay, a fabric layer was distributed and adhered to the top face of the underlay to reduce the drag between the carpet or rug and the underlay, the frictional drag without the presence of the fabric layer being sufficient to cause complaints from the workmen who must install the carpet or rug. The fabric layer also functioned to a degree as a reinforcing member that tended to prevent the underlay from stretching objectionably during use. An open-mesh light weight fabric normally was used for this purpose.

The present invention pertains to the manufacture of an underlay that has a construction that offers certain advantages over the contoured underlay structures described above. Carpet manufacturers have been fearful since the spike or French shoe heel became popular with women that this slender almost pointed shoe heel would cause excessive damage to the backing of carpeting. Experience has proven these fears to have been justified. It was found, however, that the damage done to carpets and rugs by the spiked shoe heel is at a minimum if the carpet or rug rests upon a generally flat yielding resilient surface. The underlay produced by the process of this invention provides such a surface for the carpet or rug to be supported upon while retaining the desirable features of the contoured underlay heretofore described. The underlay produced by the process of this invention comprises a generally flat upper layer of resilient cellular material which provides the generally flat surface for supporting the carpet or rug, a contoured bottom layer of resilient cellular material which has protrusions depending downwardly and separated from the upper layer and a fabric layer interposed between said upper layer and contoured bottom layer.

The invention will be more fully understood by referring to the following description and by referring to the drawing in which the single figure is a view in perspective of an underlay made by the process of this invention.

As indicated above and as clearly illustrated in the drawing, the underlay resulting from the process of this invention may be considered to be comprised of three basic components, namely a generally flat supporting layer 10 of resilient cellular material upon which the carpet or rug depends for continuous support, a fabric layer 11 bonded to the bottom face 12 of supporting layer 10, and a contoured layer 13 of resilient cellular material having downwardly depending protrusions 14, 14 that are separated from the fabric layer 11 by openings filled with air and/or other gaseous material, the contoured layer 13 being bonded to the fabric layer 11 along those zones 15, 15 of layer 13 which surround and define the extremities of the protrusions 14, 14. It will be noticed that fabric layer 11 and contoured layer 13 correspond in structure to the fabric-covered contoured sponge rubber underlay construction hereinabove described.

The supporting layer 10 may be formed of any resilient cellular material and, although it need not be produced at the same time as the contoured bottom layer 13 but instead may be formed separately and merely adhered with a suitable adhesive to the previously formed structure comprising fabric layer 11 and contoured layer 13, preferably the underlay construction is made in accordance with the process hereinafter described which involves the expansion of both layer 10 and layer 13 into cellular layers simultaneously. The resilient cellular material of the supporting layer 10 may be chemically blown natural or synthetic rubber (commonly called "sponge rubber"), latex foam rubber, polyurethane foam, vinyl chloride polymer foam or any other resilient cellular structure that has sufficient strength to support the person walking on the underlay. The supporting layer 10 can be either an open-cell or closed-cell cellular structure remembering that the closed-cell cellular structures normally are less compressible than a similar open-cell structure.

The fabric layer 11, although shown in the drawing to be an open-mesh netting, need not be an open-mesh structure but may be any fabric structure. Accordingly, the fabric layer 11 may be an open-mesh netting as shown or any woven or knitted fabric whether of close or loose weave or knit and even may be a non-woven fabric. While the fabric layer 11 does provide some degree of reinforcement to the underlay structure, the main purpose for using the fabric layer 11 in the underlay is to support layer 10 of the structure when forming the underlay upon an open-mesh conveyor by the process hereinafter described and to thereby prevent layer 10 from sagging into the interstices of the conveyor along with layer 13. It will be understood then that any fabric material is suitable, although for weight considerations as light a weight fabric as is suitable preferably is employed. An open-mesh netting having 8 to 12 threads to the inch has been found to be particularly suitable.

Although contoured layer 13 may be formed separately and, therefore, could be formed of any resilient cellular material whether of closed-cell or open-cell structure, such as chemically blown rubber, polyurethane foam, latex foam rubber and vinyl chloride polymer foam, the layer 13 in accordance with the process of this invention is formed from a chemically blown natural or synthetic rubber composition which materials most generally are referred to by the industry as "sponge rubbers." The manufacture of chemically blown rubber employing a chemical blowing agent dispersed throughout the composition is a well known art completely understood by the industry without further description of the various blowing agents and techniques which can be employed for producing the sponge rubber product.

The thickness of layers 10 and 13 when expanded will vary in accordance with the desired resiliency desired in the product and the specific compositions employed. Usually, an expanded thickness of between $\frac{1}{16}$ to $\frac{1}{8}$ inch for each layer 10 and 13 is sufficient.

The bond between supporting layer 10 and fabric layer 11 and between contoured layer 13 and fabric layer 11 may be merely the natural bond resulting from vulcanizing layers 10 and 13 in contact with fabric layer 11 or may result at least in part from the use of an adhesive material interposed between layer 10 and fabric layer 11 and between layer 13 and fabric layer 11 such as by dipping the fabric layer 11 into a suitable adhesive before assembling the fabric layer 11 with layers 10 and 13 or may result at least in part from the rubber composition of either layer 10 or layer 13 or both striking through the fabric and becoming bonded by vulcanization to the rubber composition of the layer disposed on the other side of the fabric.

Although not shown in the drawing, it will be realized that a netting or fabric layer may be disposed over the top surface of supporting layer 13 to reduce the drag of a carpet or rug over the top of the underlay construction shown and thereby make the installation of a carpet or rug over the underlay easier.

The process of this invention involves the use of an open-mesh conveyor, for example an open-mesh chain conveyor or open-mesh wire conveyor such as is described in United States Patent 2,703,909. The open-mesh design of the conveyor will determine the design of the contoured layer 13 of the underlay, the downwardly depending ridges or nodules 14, 14 corresponding in outline to the genral shape of the interstices of the open-mesh conveyor. The thin sheet of expandable vulcanizable rubber composition from which the contoured layer 13 of the underlay results is fed onto the open-mesh conveyor in a customary manner and the fabric layer 11 thereafter is disposed over the said sheet of rubber composition deposited on the conveyor. A second thin sheet of expandable vulcanizable rubber composition, the sheet from which layer 10 will be formed, then is placed over the fabric layer 11. (If a fabric layer is to be employed over the layer 10 of the underlay, such second fabric layer is deposited over the layer 10 at this time. However, for the purpose of the description of the process no fabric layer will be used over the top of supporting layer 10 of the underlay.) A web that is non-adherent to the composition of layer 10 even when in contact therewith during vulcanization normally then is disposed over the assembled layers 10, 11 and 13 which web merely insures that the layers of the underlay remain in contact until they become bonded together. The conveyor with the underlay components disposed thereupon then is advanced through a heating zone. The temperature in the heating zone is sufficient to soften the composition from which layer 13 of the underlay is formed and to decompose the blowing agent in the compositions of layers 10 and 13, a temperature between 295° and 360° F. normally being used. The softening of the composition of layer 13 causes the composition disposed over the interstices of the open-mesh conveyor to sag into the interstices, the composition at these areas of sagging becoming spaced from fabric layer 11 and layer 10 creating openings or cavities between layer 13 and layers 10 and 11. The wire or chain elements of the open-mesh conveyor maintain the composition of layer 13 that is disposed directly on such wires or chain elements in contact with the fabric layer 11 as will be understood. During the period when the sagging of those portions of the layer 13 disposed over the interstices of the open-mesh conveyor is taking place, the chemical blowing agent dispersed through the compositions of layers 10 and 13 are decomposing causing the compositions of these layers to expand into the desired cellular structure. The underlay structure on the conveyor then is subjected to a temperature sufficient to vulcanize the compositions of layers 10 and 13 (usually a temperature between 295° and 360° F. being used) and vulcanization of the two layers occurs. After vulcanization, the underlay preferably is cooled and then is removed from the conveyor as a finished product. It will be understood that the structure formed by this process is unexpected. One would think, particularly when an open-mesh fabric netting is used for layer 11, that layer 13 would bond throughout the entire interfacial surface to the fabric layer 11 and to the bottom face 12 of layer 10. It is surprising that this does not occur but it is believed that air naturally trapped between layers 10 and 13 and air perhaps in the fibers of fabric layer 11 seek the spaces between layers 10 and 13 formed when layer 13 initially begins to sag and that as the temperature in these spaces increases and causes the air to increase in volume, the air actually keeps the two layers 10 and 13 from joining together as well as assisting in causing the further sagging of those portions of layer 13 overlying the interstices of the conveyor.

I claim:
1. A method for making an underlay for supporting a carpet or rug which method comprises disposing a thin sheet of a vulcanizable rubber composition containing a chemical blowing agent onto an open-mesh conveyor, disposing a fabric layer upon the thin sheet of rubber composition previously disposed upon the conveyor, depositing a second thin sheet of a vulcanizable rubber composition containing a chemical blowing agent upon the said fabric layer, advancing said open-mesh conveyor with said assembly comprised of the two said sheets of rubber composition and the layer of fabric through a heating zone maintained at a temperature at which the first-mentioned sheet of rubber composition softens and sags into the interstices of the open-mesh conveyor, the areas of the first-mentioned sheet of rubber composition which so sag separating themselves from contact with the said fabric layer, and at a temperature at which the chemical blowing agent in the first-mentioned sheet of rubber composition and in the second-mentioned sheet of rubber composition decomposes and causes both the first-mentioned sheet of rubber composition and the second-mentioned sheet of rubber composition to expand into cellular structures, and continuing to heat the said assembly being conveyed on the said open-mesh conveyor to vulcanize the said layers of rubber composition in their expanded condition and to cause the components of the said assembly to be bonded into an integral structure.

References Cited
UNITED STATES PATENTS

| | | | |
|---|---|---|---|
| 2,052,605 | 9/1936 | Clark et al. | 161—127 |
| 2,480,316 | 8/1949 | Blair et al. | 156—205 |
| 2,703,909 | 3/1955 | Harwin et al. | 156—79 |
| 2,739,093 | 3/1956 | Bull | 156—79 |
| 2,740,739 | 4/1956 | Harwin et al. | 161—74 |
| 2,999,041 | 9/1961 | Lappala | 161—161 |
| 3,232,806 | 2/1966 | Widmer | 156—212 |

FOREIGN PATENTS 813,311  5/1959  Great Britain.

EARL M. BERGERT, *Primary Examiner.*

C. B. COSBY, *Assistant Examiner.*

U.S. Cl. X.R.

156—212, 292; 161—74, 89, 127, 161